United States Patent
Östvold et al.

(10) Patent No.: US 7,841,804 B2
(45) Date of Patent: Nov. 30, 2010

(54) METHOD AND COMPOSITION FOR STABILIZING EARTH AND SAND TO PREVENT SOIL EROSION

(75) Inventors: Terje Östvold, Trondheim (NO); Tore Larsen, Trondheim (NO); Öyvind Gustavsen, Ranheim (NO); Katerina Kofina, Athen (GR); Takis Paraskevas, Patras (GR); Petros Koutsoukos, Patras (GR); Marianna Lioliou, Patras (GR)

(73) Assignee: Impermeable AS, Fornebu (NO)

( * ) Notice: Subject to any disclaimer, the term of this patent is extended or adjusted under 35 U.S.C. 154(b) by 415 days.

(21) Appl. No.: 12/084,381

(22) PCT Filed: Nov. 8, 2006

(86) PCT No.: PCT/NO2006/004400

§ 371 (c)(1),
(2), (4) Date: Jun. 5, 2008

(87) PCT Pub. No.: WO2007/064213

PCT Pub. Date: Jun. 7, 2007

(65) Prior Publication Data

US 2010/0172700 A1  Jul. 8, 2010

(30) Foreign Application Priority Data

Nov. 9, 2005  (NO) ................... 20055255

(51) Int. Cl.
*E02D 3/12* (2006.01)

(52) U.S. Cl. .................... 405/263
(58) Field of Classification Search ......... 405/263–269, 405/302.4
See application file for complete search history.

(56) References Cited

U.S. PATENT DOCUMENTS

| 4,334,905 A | 6/1982 | Wagner et al. |
| 6,401,819 B1 | 6/2002 | Harris et al. |
| 2001/0046419 A1* | 11/2001 | Taki et al. ............ 405/263 |

FOREIGN PATENT DOCUMENTS

| JP | 2-173185 | * 2/1990 |
| JP | 19920148842 | 12/1993 |
| WO | WO 0153202 | 7/2001 |

OTHER PUBLICATIONS

R.E. Harris et al, "New Applications for Enzymes in Oil and Gas Production", European Petroleum Conference, 1998, vol. 1, SPE, 50621, pp. 467-475.

* cited by examiner

*Primary Examiner* — John Kreck
(74) *Attorney, Agent, or Firm* — Dennison, Schultz & MacDonald

(57) ABSTRACT

Method for stabilizing sand and earth by precipitation of struvite, comprising applying an aqueous solution of salts comprising: a) $Mg^{2+}$ ions of a concentration 10-200 mM, b) $NH_4^+$ ions either added in the form of ammonium salt or from decomposition of added urea, of concentration 10-200 mM, c) anions added as part of corresponding cations, d) polyphosphate ($Na_5P_3O_{10}/Na_3P_3O_9$) of concentration 10-100 mM, e) a catalyst chosen among acidic and alkaline phosphatase.

12 Claims, 1 Drawing Sheet a)

b)

QNC technology; laboratory data showing possible use of earth stabilization to prevent soil erosion

US 7,841,804 B2

METHOD AND COMPOSITION FOR STABILIZING EARTH AND SAND TO PREVENT SOIL EROSION

This application is a 371 of PCT/NO2006/000400 filed on Nov. 8, 2006.

The present invention concerns a method and a composition for stabilizing earth and sand to prevent erosion through precipitation of at least one mineral by means of a technology that may be called quasi natural consolidation (QNC) because the method make use of natures own chemicals Furthermore the invention concerns a composition to be used when conducting the method.

BACKGROUND

Soil erosion is a major problem all over the world. It is caused by severe wind and heavy rainfalls that remove fertile soil from agricultural areas. By stabilizing the uppermost layer so it is not easily moved from the earth below by wind or flooding water, large and vulnerable cultural areas can be preserved.

It is known from a number of publications to stabilize earth and subterranean formations by addition or injection of different salt solutions which are precipitated at desired location to cause a binding of loose particles in the formation or earth so that they not easily collapse or are washed out.

Norwegian laid-open publication 313 203 describes a method for precipitating inorganic salts in porous media like e.g. grit formations in unconsolidated hydrocarbon containing reservoirs. According to this method a solution of a first soluble salt is first injected into the formation, then a non-reactive electrolyte is injected followed by a second solution of a second soluble salt, after which, finally, another non-reactive electrolyte is injected. All said solutions/electrolytes are injected to substantially the sae location, namely where the precipitation is desired to take place. To mix the two salt solutions which are both soluble when kept apart from each other but upon mixing cause a desired precipitation, a pump arrangement is required to alternately push and pull the injected solutions and electrolytes until they are thoroughly mixed. Salt solutions described as suitable for the purpose are, as the first solution typically $CaCl_2$ and as the second solution typically $KH_2PO_4$, the salt precipitated therefrom being octacalcium-phosphate $Ca_8H_2(PO_4)*5H_2O$. The method has not proved to be effective in full scale, i.a. because the desired pump action is difficult and time consuming and because a high number of repetitive injections are required to achieve the desired stabilizing.

In U.S. Pat. No. 5,143,155 is mentioned that reduction of porosity and permeability of oil reservoirs is possible by precipitating $CaCO_3$ from an aqueous solution containing calcium chloride, urea and urease manufactured bacterial in situ. The object of the patent is to reduce porosity/permeability of geological subterranean formations to increase oil production from an oil reservoir and to reduce the flow of contaminations from previous operation present in the aqueous phase. The '155 patent is not concerned with problems generally related to stabilizing earth (soil) or formations.

It is taught in SPE publications 50621 (Harris, R. E. and McKay, I. D. *New application for enzymes in oil and gas production*. The 1998 SPE European Petroleum Conference, The Hague, The Netherlands 20-22 Oct. 1998) that urease may be used to decompose urea to consolidate sand when precipitating $CaCO_3$. It is also mentioned in this publication that calcium phosphate can be produced in a reaction between an enzymatically decomposed phosphate and calcium chloride. The publication concludes that such materials have a potential for sealing water conveying layers and for applications related to sand stabilizing.

OBJECTIVES

It is an object of the present invention to provide an improved method for preventing soil erosion which is environmentally friendly end inexpensive.

It is furthermore a derived object to be able to bring about the above object in a technical/industrial manner rendering the process easy to conduct, by using raw material dissolved in water which are industrially available in large scale while the precipitated material that prevents soil erosion only slowly is dissolved and supplies the earth with desired nutrients when plants are about to grow.

THE INVENTION

The invention concerns according to a first aspect a method which is characterized by the features disclosed by claim 1.

According to a second aspect the invention concerns a composition characterized by the features disclosed by claim 11.

Preferred embodiments of the invention are disclosed by the dependent claims.

By applying the method according to the present invention, which may easily be adapted to different needs, situations and applications, an effective, convenient, and therefore inexpensive treatment of the soil is obtained. It may be, sufficient with one single surface treatment without any kid of pre-treatment of the soil to be stabilized. It is typically sufficient with less than ten repetitions to obtain a adequate stabilizing.

The method and the composition thus represent significant improvements in relation to the priory known techniques in the area and has proved well suited in laboratory tests.

In general the present invention is environmentally friendly; the solutions have good moistening properties and a very good penetration ability in porous, water moistening materials.

What regards the chemistry of the present invention, it implies a controlled precipitation of inorganic salts, et least of $MgNH_4PO_4.6H_2O$ (struvite), possibly also of and as well as other compounds containing calcium, magnesium, carbonate, phosphate or ammonium and which bind clay, earth and sand particles to a coherent matrix that can endure external physical loads.

As mentioned such compounds have earlier been attempted used for stabilizing subterranean formations but as far as the inventor knows, no such use as here described has priory been described.

Use of simple inorganic compounds combined in one single solution provides several advantages. Inexpensive raw materials which are also compatible with the environment results in a consolidation process and/or a stabilizing process that is environmentally friendly. Another advantage of the proposed method is the possibility to apply the relevant aqueous solutions with equipment used e.g for irrigation after minor modifications thereof.

Presence of catalysts in the same solution as the salts implies a quick and efficient precipitation of minerals that stabilizes the soil surface down to a level some centimetres from the top after application of the solution in question. The method makes it possible to use solutions with comparatively high concentrations of the different salts without premature precipitation. The reason for this is the fact that catalysts have to work for a while before the solution is fully saturated and the precipitation starts.

IN practice the best stabilizing effect is obtained when the treatment is repeated and it is preferred to repeat the treatment about 1 to 10 times to achieve desired stabilizing.

Below the present invention is elaborated by means of some examples.

The Chemical Basis; Precipitation of Difficultly Soluble Minerals which are Able to Effectively Consolidate Sand and/or Earth The Struvite and Calcium Phosphate Processes According to the present invention in its general form, compounds are applied in a suitable manner to cause precipitation of struvite ($MgNH_4PO_4.6H_2O$). Struvite has been thoroughly tested in laboratory tests and the method is quite similar to the method of precipitation of calcium phosphate described below. In the form below $MgCl_2$ or $Mg(NO_3)_2$ and $NH_4Cl$ is used in solution A

$$Mg^{+2} + PO_4^{-3} + NH_4^+ + 6.H_2O = MgNH_4PO_4.6H_2O \quad (1)$$

Furthermore:

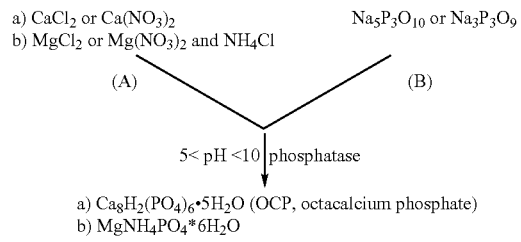

Different crystal forms of struvite can precipitate dependent upon the experimental conditions.

The precipitated crystals of the difficultly soluble minerals settle on sand/earth particles of the material to be treated and bind these together to a consolidated masse.

From table 1 can be seen that precipitation rate of struvite varies significantly with pH. This is to be expected from the equilibrium constant for equation 1 since the concentration of $PO_4^{3-}$ is highly pH dependent.

Calcium phosphate as sand stabilizing additive is thoroughly tested in laboratory experiments. An aqueous solution comprising calcium, polyphosphate, and the phosphatase catalyst will slowly precipitate comparatively large amounts of solid calcium phosphate. Four crystal forms of calcium phosphate can precipitate dependent upon the experimental conditions like pH, ion strength, additives etc.:

Hydroxy apatite, HAP, $Ca_5(PO_4)_3OH$
Dicalcium phosphate dihydrate, DCPD, $CaHPO_4.2H_2O$
Tricalcium phosphate, β-TCP, $Ca_3(PO_4)_2$
Octacalcium phosphate, OCP, $Ca_8H_2(PO_4)_6.5H_2O$ For example, OCP can e formed by the reaction between the soluble calcium salts (e.g. $CaCl_2$, $Ca(NO_3)_2$) and polyphosphates (e.g. $Na_5P_3O_{10}$ or $Na_3P_3O_9$).

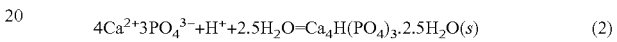

$$4Ca^{2+} + 3PO_4^{3-} + H^+ + 2.5H_2O = Ca_4H(PO_4)_3.2.5H_2O(s) \quad (2)$$

CONCLUSION

Struvite and the Calcium Phosphate Processes

Figure 1:
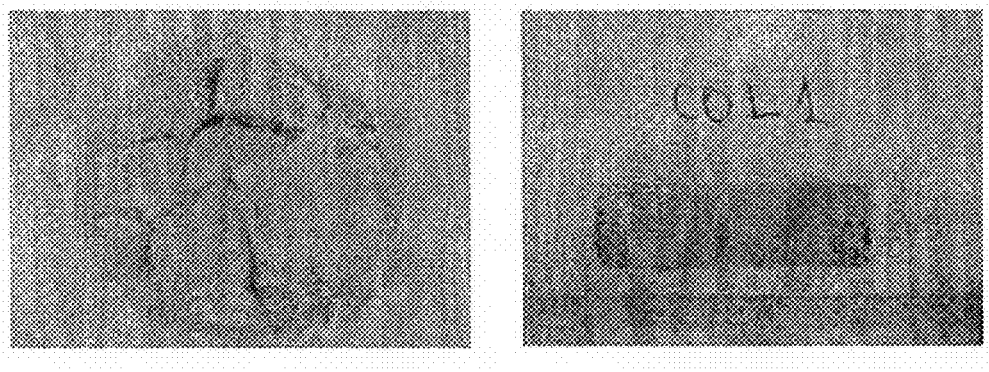
FIG. 1 shows sand stabilized with struvite, $MgNH_4PO_4.6H_2O$. $Na_5P_3O_{10}=0.01$ M, $MgCL_2=0.02$ M, $NH_4Cl=0.02$ M, phosphatase=0.167 g/l. a) Sand in a dish, b) In a column at 0.25° C.; 11 injections with 24 hours intervals.
Figure 2:
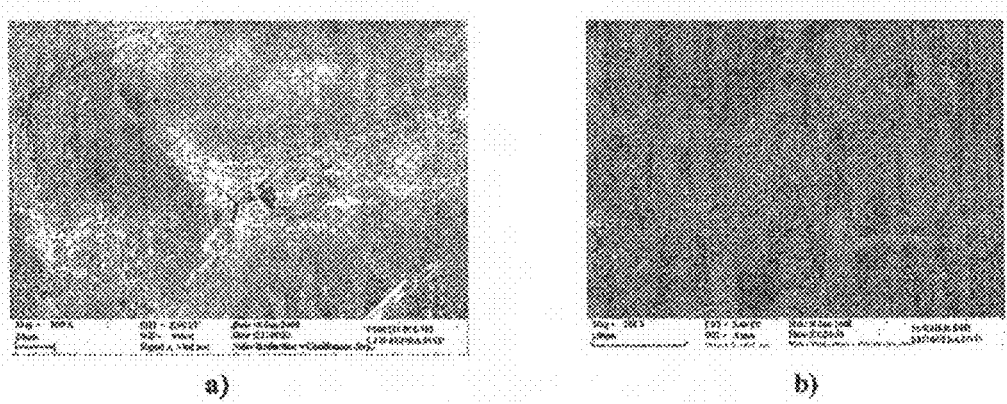
FIG. 2 shows sand stabilized with struvite, $MgNH_4PO_4.6H_2O$ crystals precipitated by a) alkaline phosphatase catalyzed hydrolysis of $Na_5P_3O_{10}$, and by b) acidic phosphatase catalyzed hydrolysis of $Na_3P_3O_9$.
Figure 3:
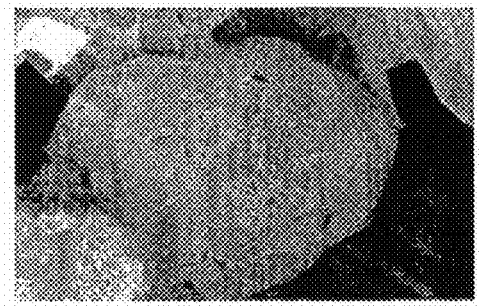
FIG. 3 shows struvite, $MgNH_4PO_4.6H_2O$, crystals gradually formed from an aqueous solution containing $Mg^{2+}$ og $NH_4^+$ and a polyphosphate. The phosphatase catalyst which was also present in the aqueous solution, caused a slow decomposition of the polyphosphate to $PO_4^{3-}$.

It is clearly illustrated by Table 1 and the FIGS. 1-3 that struvite is well suited for stabilizing porous media like sand

TABLE 1

Initial conditions, thermodynamic data and rate of precipitation of struvite with acidic phosphatase (2.187 g/l), pH = 7.50, and with alkaline phosphatase (0.167 g/l), pH = 9.8 at T = 25° C. The time until precipitation starts, τ, as well as the initial rate of precipitation, R, are also listed.

| Mg:Substrate | mol/l | $MgCl_2 \cdot 2H_2O$ mol/l | $NH_4Cl$ mol/l | τ (h) | (M) | $SR_{struvite}$ | $R_{initial}$ (mol/t) |
|---|---|---|---|---|---|---|---|
| | $Na_3P_3O_9$ | | | | $HPO_4^-$ | | |
| 1:1.5 | 0.025 | 0.0375 | 0.0375 | 5 | 0.0099 | 68.71 | $0.7729 \times 10^{-4}$ |
| 1:2 | 0.025 | 0.05 | 0.05 | 2.5 | 0.0092 | 90.36 | $1.2353 \times 10^{-4}$ |
| 1:3 | 0.025 | 0.075 | 0.075 | 1 | 0.0081 | 129.12 | $1.4482 \times 10^{-4}$ |
| | $Na_5P_3O_{10}$ | | | | $H_2PO_4^-$ | | |
| 1:1.5 | 0.01 | 0.015 | 0.015 | 2.5 | 0.02354 | 134.27 | $2.3063 \times 10^{-4}$ |
| 1:2 | 0.01 | 0.02 | 0.02 | 1 | 0.02109 | 220.29 | $5.4499 \times 10^{-4}$ |
| 1:3 | 0.01 | 0.03 | 0.03 | 0.5 | 0.01437 | 245.47 | $5.7000 \times 10^{-4}$ | and earth. The stabilization is feasible by the method according to the present invention and leads to precipitation of struvite.

The Calcite Process

Urea represents a group of amines of which the simplest form is $(NH_2)_2CO$. Urea is present in living organisms and is thus not toxic. It is manufactured in large amounts for industrial applications and is therefore an inexpensive raw material. Urea is easily dissolved in water and can be split by the reaction $$(NH_2)_2CO(aq)+H_2O=CO_3^{2-}(aq)+2NH_4^+(aq) \quad (3)$$

The reaction is slow at room temperatures but the reaction rate increases with increasing temperature. The enzyme urease can be used in small amounts to increase the reaction rate at temperatures below about 60° C. As mentioned it is known from prior art that calcium, urea and urease can form $CaCO_3$ to change the permeability of porous media. It is, however, not previously disclosed that the $CaCO_3$ formed enzymatically by the reactions 3 and 4 can vary significantly with respect to their sand stabilizing affect dependent upon the type of urease that is used. The choices of urease catalyst and refinery method thereof, if any, have a large impact on the consolidation effect. The inventors have found that the catalyst must be a plant based catalyst. A combination of precipitation of struvite ad precipitation of calcite based on this recognition with respect to the urease catalyst represents a preferred embodiment of the present invention. Most preferred raw material for the catalyst is Jack Bean Meal which gives an active catalyst for precipitation of $CaCO_3$ when using e.g. a water extract of the substance. The aqueous solution can contain large amounts of raw material for the formation of $CaCO_3$ without premature formation of the product at an inadequate location. The consolidation/sealing reaction is:

$$MX_2(aq.)+CO_3^{2-}(aq.)+2NH_4^+(aq)=MCO_3(s)+ 2NH_4X(aq.) \quad (4)$$

By combining the solutions A and B and thereafter add a certain amount of the catalyst dissolved in water or another suitable solvent, a slow formation of $CaCO_3$ is obtained which contributes to stabilize loose, sand containing media.

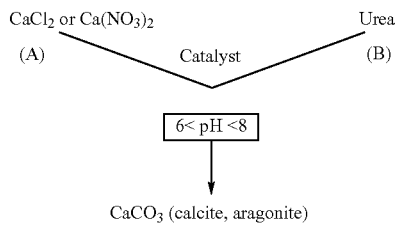

A number of parameters influence on the precipitation and stabilizing process. The amount of raw material and the catalyst concentration as well as temperature has an important impact. Varying concentrations of the starting materials is required to achieve optimal results in dependence of the type of earth to be stabilized.

Table 2 summarizes data and results for precipitation of $CaCO_3$ and consolidation of some sand packs. The apparatus was originally filled with silicate sand with average grain size=$d_{gr}$=0.1-0.3 mm. After packing the porosity was $\epsilon_o$=0.36 while the permeability was 8-10 Darcy during water flooding. To stabilize the sand pack t was filled with the solution defined in Table 2. The table shows permeability development and sand production rate respectively as function of number of injections performed after consolidation. The concentration of the solution and retention time in the column will vary with the desired result. In the present consolidation tests the objectives were a small reduction of permeability and limited consolidation.

TABLE 2

Treatment of sand with a QNC aqueous solution: $Ca^{2+}$ and urea 0.75 mole/l + Jack Bean Meal urease 10 g/l dissolved in water and filtrated. Permeability and sand free flow rates after consolidation

| T/° C. | Number of injections | Flow rate ml/min | Pressure loss/bar over column | Final permeability Darcy/cm/s | Initial Permeability Darcy/cm/s |
|---|---|---|---|---|---|
| 25 | 0 | 3 | 0.00 | 10 | 10 |
| 25 | 1 | 29 | 0.09 | 4.61* | 5.42* |
| 25 | 2 | 150* | 0.45 | 7.03 | — |
| 50 | 1 | 150 | 0.55 | 7.28 | 10.4 |
| 50 | 2 | 150 | 0.53 | 7.45 | 10.3 |
| 60 | 1 | 40.4 | 0.14 | 7.58 | 9.80 |
| 60 | 2 | 150 | 0.55 | 6.20 | 9.60 |
| 50 | 1 | 35 | 0.25 | 3.06 | 3.73 |
| 50 | 2 | 105 | 0.70 | 3.56 | 4.43 |
| 50 | 3 | 130 | 0.70 | 3.43 | 5.37 |
| 60 | 1 | 15 | 0.10 | 1.89** | 5.74 |
| 60 | 2 | 50 | 0.35 | 4.55 | 6.70 |
| 60 | 3 | 110 | 0.65 | 3.40 | 6.01 |

*Maximum pump speed. No sand production.
**Measured permeability is probably too low due to major precipitation at the column inlet.

The column which was used for consolidation of the sand packs was 12.65 cm long and 2.74 cm in diameter. The change of permeability was measured after each injection while the sand production was measured at the end of each test.

Conclusion; the Calcite Process

It is clearly illustrated by table 2 that calcite is well suited for stabilizing loose sand and addition of salts that leads to precipitation of calcite in combination with precipitation of struvite thus represents a particularly preferred embodiment of the present invention.

The present invention provides new and useful information with respect to stabilizing sand and earth, as the combination of features constituting the invention enables an effective stabilization with only one solution and a limited number of repetitions. In industrial context the advantages related to one solution only and few repetitions are decisive with respect to the crucial cost efficiency consideration.

It is thus preferred to add a combination of salts which also includes calcium and urea and of a concentration 1-1500 mM as well as a plant based urease catalyst. The urease catalyst can advantageously be a urease catalyst prepared from a Jack Bean Meal raw material.

In the preparation of such a urease catalyst a certain amount of Jack Bean Meal is extracted into a solvent comprising water or which is water soluble, after which the solid residue is filtered off while the solvent extract constitute the urease catalyst or a concentrate thereof.

With respect to the concentration of magnesium ions and polyphosphate an improved stabilization is usually achieved at few repetitions if the concentration is at least 40 mM which is therefore a preferred minimum concentration. Magnesium is typically added in the form of chlorides and/or nitrates. Also calcium, when present, is typically added as chlorides and or nitrates and preferably in concentrations of at least 40 mM.

The invention claimed is:

1. Method for stabilizing sand and earth by precipitation of at least one mineral, said method comprising applying to the sand an aqueous solution of salts comprising:
   a) $Mg^{2+}$ ions of concentration 10-200 mM
   b) $NH_4^+$ ions added either as an ammonium salt or from decomposition of added urea, of concentration 10-200 mM
   c) anions added as part of corresponding cations
   d) polyphosphate ($Na_5P_3O_{10}/Na_3P_3O_9$) of concentration 10-100 mM
   e) a catalyst chosen among acidic or alkaline phosphatase.

2. Method as claimed in claim 1, further comprising the addition of $Ca^{2+}$ ions and urea in a concentration in the range 1-1500 mM and a plant based urease catalyst.

3. Method as claimed in claim 2, wherein the plant based urease catalyst is prepared from a Jack Bean Meal raw material.

4. Method as claimed in claim 3, wherein a predetermined amount of Jack Bean Meal is extracted into a solvent comprising water or is water soluble after which the solid residue is filtered out while the solvent extract constitute the urease catalyst or a concentrate of said catalyst.

5. Method as claimed in claim 1, wherein the solution is sprayed onto a earth surface area to be stabilized 1-10 times to obtain a desired stabilizing.

6. Method as claimed in claim 1, characterized in that wherein the components a) and d) are present in a concentration of at least 40 mM.

7. Method as claimed in claim 1, wherein the acidic or basic phosphatase catalyst is present in an amount of up to 3 grams/liter in the solution.

8. Method as claimed in claim 1, wherein the magnesium ions are added in the form of magnesium chloride or nitrate.

9. Method as claimed in claim 2 wherein the calcium ions are added in the form of calcium chloride or nitrate.

10. Method as claimed in claim 2, wherein the calcium ions are added in a concentration of at least 40 mM.

11. Stabilizing composition for sand and earth or mixtures of sand and earth by precipitation of at least one mineral, said composition comprising:
    a) $Mg^{2+}$ ions of concentration 10-200 mM
    b) $NH_4^+$ ions added either as an ammonium salt or from decomposition of added urea, of concentration 10-200 mM
    c) anions added as part of corresponding cations
    d) polyphosphate ($Na_5P_3O_{10}/Na_3P_3O_9$) of concentration 10-100 mM
    e) a catalyst chosen among acidic or basic (alkaline) phosphatase.

12. Stabilizing composition as claimed in claim 10 wherein the composition also comprises Ca ions and urea in a concentration in the range 1-1500 mM and a plant based urease catalyst.

* * * * *